FIG. 1.

C. F. R. KURTZE & W. GILLARD.
CEMENT TILE MAKING MACHINE.
APPLICATION FILED APR. 22, 1911.

1,116,080.

Patented Nov. 3, 1914.

UNITED STATES PATENT OFFICE.

CHARLES FREDERICK REIMAR KURTZE AND WILLIAM GILLARD, OF STRATFORD, ONTARIO, CANADA.

CEMENT-TILE-MAKING MACHINE.

1,116,080. Specification of Letters Patent. Patented Nov. 3, 1914.

Application filed April 22, 1911. Serial No. 622,699.

*To all whom it may concern:*

Be it known that we, CHARLES FREDERICK REIMAR KURTZE and WILLIAM GILLARD, both of the city of Stratford, in the county of Perth, in the Province of Ontario, Canada, have invented certain new and useful Improvements in Cement-Tile-Making Machines, of which the following is the specification.

Our invention relates to improvements in cement tile making machines and the object of the invention is to devise a machine in which all manual labor will be dispensed with in removing the tile from the mold to the receiving table and the output thereof materially increased and thereby the tile made more economically.

A further object is to produce a tile of uniform density and therefore rendered when green less liable to fracture; and the invention consists essentially of a mold frame supported within the vertical guideways by suitable counter weights, molds secured within the mold frame, means for automatically opening the molds to deliver the tile onto a suitable platform or table, a truck supporting the table and means for feeding the truck from beneath the mold frame by a step-by-step movement so as to allow a fresh set of tiles to be deposited on the truck, means for feeding the cement into the molds and rotatable formers having screw like flanges designed to co-act with the counter weighted molds and mold frame to compress the cement within the molds the parts being constructed in detail as hereinafter more particularly explained by the following specification.

In the drawings like letters of reference indicate corresponding parts in each figure.

A is the base frame.

$A^1$ and $A^2$ are rails secured upon the base frame.

$A^3$ and $A^4$ are vertical standards secured to the base frame at their lower end and together by cross plates $A^5$ at their upper end so as to form a vertical guide $A^6$.

$A^7$ and $A^8$ are similar standards secured at the other side of the base frame A opposite the standards $A^3$ and $A^4$. The standards $A^7$ and $A^8$ form a guide way $A^9$.

B and B' are plates on which are journaled the friction rollers $B^2$, $B^3$, $B^4$ and $B^5$. The rollers $B^2$ and $B^3$ bear against one side of the guide ways $A^6$ and $A^9$ and the rollers $B^4$ and $B^5$ bear against the other side of the guide ways so as to allow of the free vertical movement of the plates B and B'.

$B^6$ and $B^7$ are angle bars connecting the plates B and $B^1$ together.

$A^{10}$ are braces connecting the standards $A^4$ and $A^8$ to the base frame A.

C is the main shaft journaled in suitable brackets C' secured to the braces $A^{10}$.

$C^2$ is a driving pulley mounted upon the driving shaft C.

$C^4$ is a counter shaft journaled in suitable brackets $C^5$ also secured to the brace $A^{10}$.

$C^6$ is a bevel pinion mounted upon the main shaft C.

$C^7$ is a worm spindle journaled in a bracket $C^8$ and provided with a worm $C^9$ and at its upper end with a bevel gear $C^{10}$ meshing with the bevel gear $C^6$ on the main shaft C.

$C^{11}$ is a worm gear mounted upon the supplemental shaft $C^4$ and meshing with the worm $C^9$ by which it is driven.

$C^{12}$ and $C^{13}$ are cams mounted upon the shaft $C^4$.

$B^8$ are levers pivoted at $B^9$ on the bracket $B^{10}$ secured to the brace $A^{10}$.

$B^{11}$ are links pivotally connected to the opposite end of the levers $B^8$ at one end and swung upon the pins $B^{12}$ at their opposite ends, the pins $B^{12}$ extending from each plate B and B'.

$B^{13}$ are rollers journaled on the pins $B^{14}$ extending from the levers $B^8$ so as to bear against the cams $C^{12}$ and $C^{13}$.

$A^{11}$ are idler sprockets mounted upon the cross shafts $A^{12}$ extending between the standards $A^3$, $A^4$ and the standards $A^7$ and $A^8$.

$A^{13}$ are sprocket chains secured at their lower ends to the pins $B^{12}$ and extending over the idler sprockets $A^{11}$.

$A^{14}$ are counter weights secured to the free depending end of each sprocket chain $A^{13}$.

$B^{15}$ are supplemental plates secured to the bars $B^6$ and $B^7$ in proximity to the plates $B$ and $B'$.

$B^{16}$ and $B^{17}$ are bars extending between the plates $B^{15}$ thereby connecting them together.

$D$ are molds which are cylindrical and are provided with inclined upper ends $D'$ and a rear notch $D^2$ from which extends the central split $D^3$ to the bottom of the mold. It will of course be understood that the mold is made of suitable spring metal. The molds $D$ are riveted or otherwise suitably secured to the bars $B^{16}$ and $B^{17}$ extending to the front of the same. The plates $B^{15}$ are provided at their lower ends with inwardly extending lips $B^{18}$.

$D^4$ and $D^5$ are slidable members forming the bottom of the mold, such members when in their closed position meet on a line extending diametrically across the bottom of the mold. The opposing edges of the members $D^4$ and $D^5$ are provided opposite the bottom of the mold with semi-circular notches $D^6$ so that when the members $D^4$ and $D^5$ are brought together into their closed position a ledge is formed extending inwardly around the bottom of the mold so as to support the bottom end of the wall of the tile.

$E$ and $E'$ are supplemental standards secured at each side of the base frame $A$ to the rear of the guiding standards $A^3$ and $A^4$ $A^7$ and $A^8$.

$D^7$ is a lever pivoted intermediately of its length on a stud $E^2$ extending from the standard $E$. The front end of the lever is provided with a right angular turn $D^8$ and on the rear end of the lever is mounted a friction roller $D^9$.

$B^{19}$ are slots formed in the plates $B^{15}$ in proximity to the lower and the rear end thereof.

$D^{10}$ are pins extending from the members $D^4$ and $D^5$ through the slots $B^{19}$ of the plates $B^{15}$.

Figure 4:
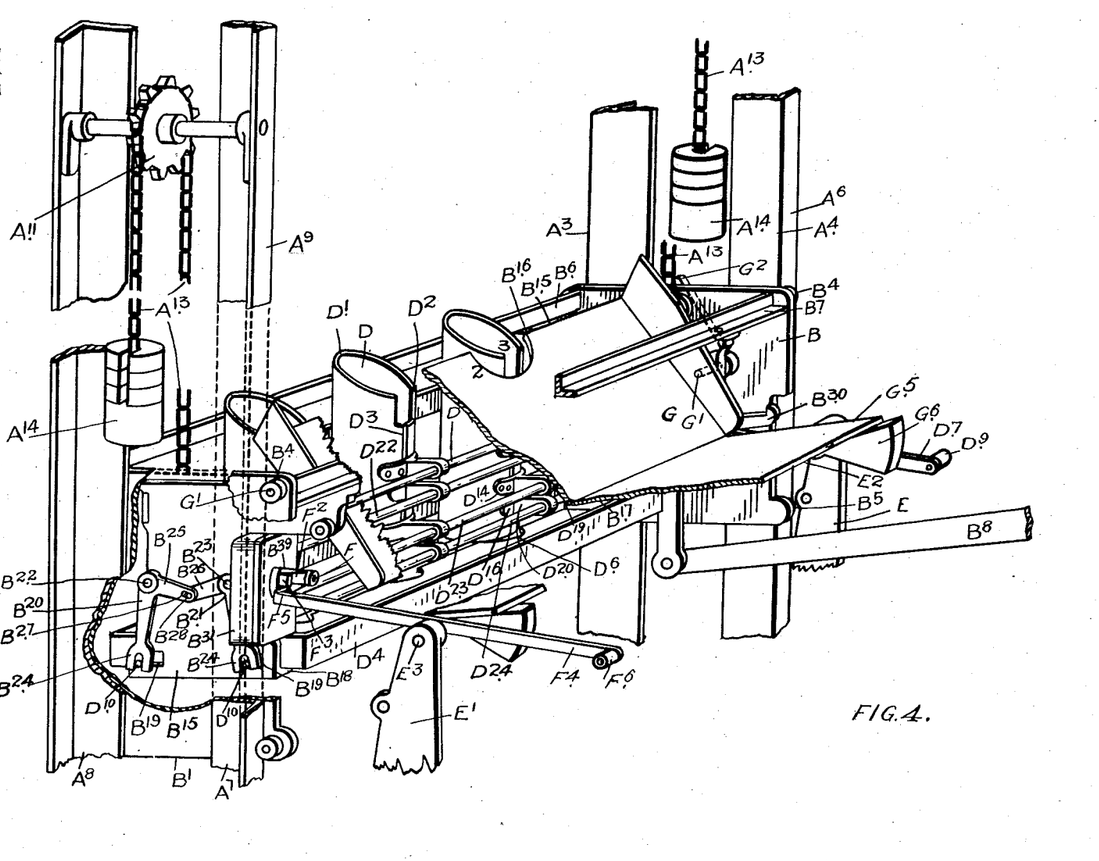
Fig. 4, is an enlarged perspective detail of the mold frame and adjacent parts looking from the rear.

$B^{20}$ and $B^{21}$ are bell crank levers pivoted on the shaft $B^{22}$ and pins $B^{23}$ extending from the plate $B^{15}$. The downwardly extending arm of the bell cranks $B^{20}$ and $B^{21}$ are provided with forked ends $B^{24}$ engaging the pins $D^{10}$. The upper arms $B^{25}$ and $B^{26}$ extend toward each other, one of such arms being provided with a slot $B^{27}$ and the other is provided with an outwardly extending pin $B^{28}$ extending into the slot $B^{26}$ (see Fig. 4). It will be understood that a similar pair of bell crank levers is pivoted at the opposite side of the mold, the corresponding lever $B^{21}$ being pivoted on the pin $B^{29}$ and is provided with an outwardly extending supplemental operating arm $B^{30}$ against which the end $D^8$ of the lever $D^7$ bears.

$D^{11}$ is a depending arm secured to the brace $A^{10}$ and provided at its lower end with a right angular extension $D^{12}$. Each mold $D$ is provided with segmental portions $D^{13}$ and $D^{14}$ secured to the side 2 of the split $D^3$ of a mold, such segmental portions $D^{13}$ and $D^{14}$ extending across the split as shown.

$D^{15}$ and $D^{16}$ are similar portions secured to the other side of the split mold and also extending across the split $D^3$.

As described in relation to the portions $D^{13}$ and $D^{14}$, the pieces $D^{13}$, $D^{14}$, $D^{15}$ and $D^{16}$ are provided with arms $D^{17}$, $D^{18}$, $D^{19}$ and $D^{20}$. $B^{31}$ is a gear box forming part of one of the plates $B^{15}$. $D^{21}$, $D^{22}$, $D^{23}$ and $D^{24}$ are longitudinal slidable rods extending through the plate $B^{15}$ at each end and at one end into the gear box $B^{31}$. The rods $D^{21}$, $D^{22}$, $D^{23}$ and $D^{24}$ are provided with flattened end portions $D^{25}$, $D^{26}$, $D^{27}$ and $D^{28}$ provided with rearwardly extending pins $D^{29}$, $D^{30}$, $D^{31}$ and $D^{32}$.

$D^{33}$ and $D^{34}$ are lever plates pivoted upon the pins $B^{40}$ and $B^{41}$ and having notched ends $D^{37}$ and $D^{38}$ and longitudinal slots $D^{39}$ and $D^{40}$.

$D^{51}$ is a plate held in vertical guides $D^{52}$ forming part of the gear box $B^{31}$. The plate $D^{51}$ is provided with a slot $B^{33}$ formed in a compound curve and a slot $B^{34}$ formed with a vertical portion $B^{35}$ and an arc-shaped portion $B^{36}$. The plate is also provided with a rearwardly extending pin $B^{38}$. The gear box $B^{31}$ is provided with an extension $B^{39}$.

$F$ is a rocking rod journaled in the extension $B^{39}$ and provided at its inner end with a forked arm $F'$ and at its outer end with a lever $F^2$. The lever $F^2$ is provided with a right angular portion $F^3$.

$F^4$ is a lever pivoted intermediately of its length on the stud $E^3$. The forward end of the lever $F^4$ is provided with a right angular extension $F^5$ extending beneath the right angular extension $F^3$ of the lever $F^2$. The rear end of the lever $F^3$ is provided with friction roller $F^6$ designed to engage with the projection $N^{12}$ fastened to the cam $C^{13}$.

$G$ is a spill board pivoted at each end on pins $G'$ extending from the plates $B^{15}$.

$G^2$ is an arm secured to one of the pins $G'$. The spill board $G$ is pivoted nearer to one side than the other so as to hold the spill board normally horizontal against the molds until the arm $G^2$ strikes the projection $G^4$.

$G^3$ is a depending arm provided with a right angular extension $G^4$ designed to engage with the arm $G^2$ when the mold is in its lowermost position.

$G^5$ is a supplemental spill board swung upon the studs $E^2$ and $E^3$ at each end. The forward end of the supplemental spill board $G^5$ extends beneath the lower edge of the spill board G. The supplemental spill board $G^5$ is provided at its rear side with counter weights $G^6$.

Figure 2:
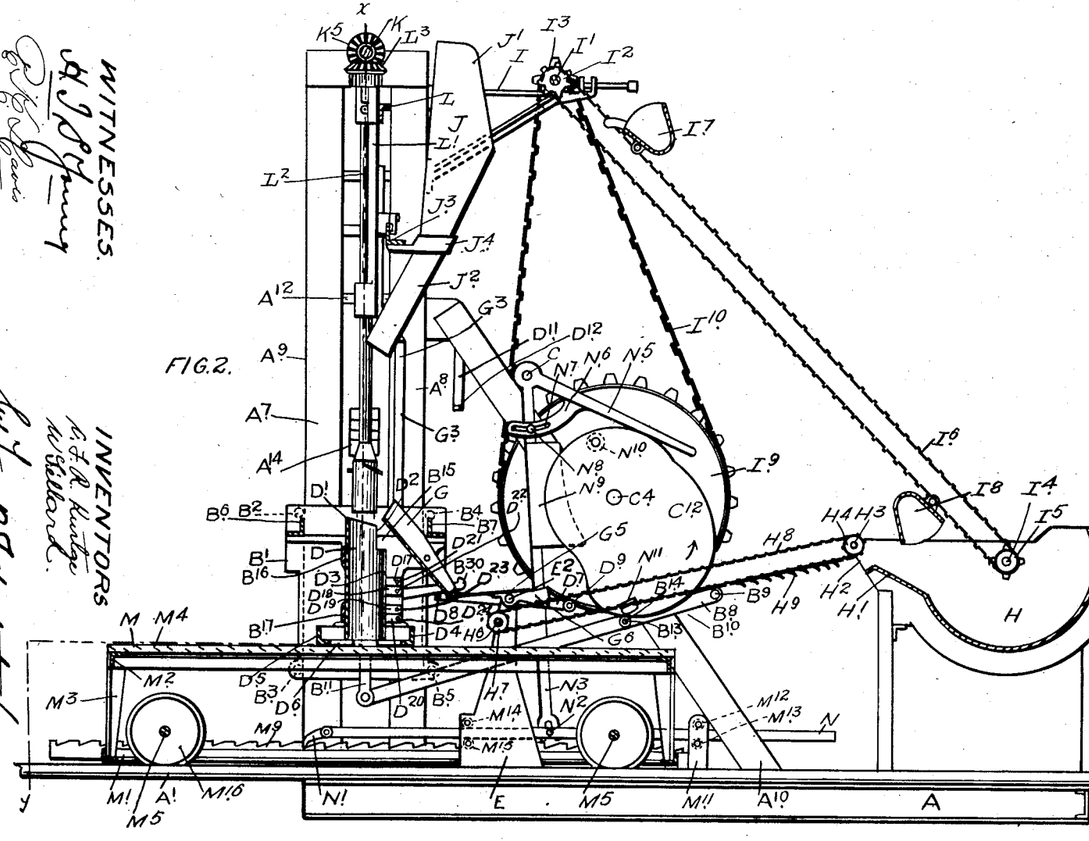
Fig. 2, is a longitudinal section through our machine.
Figure 3:
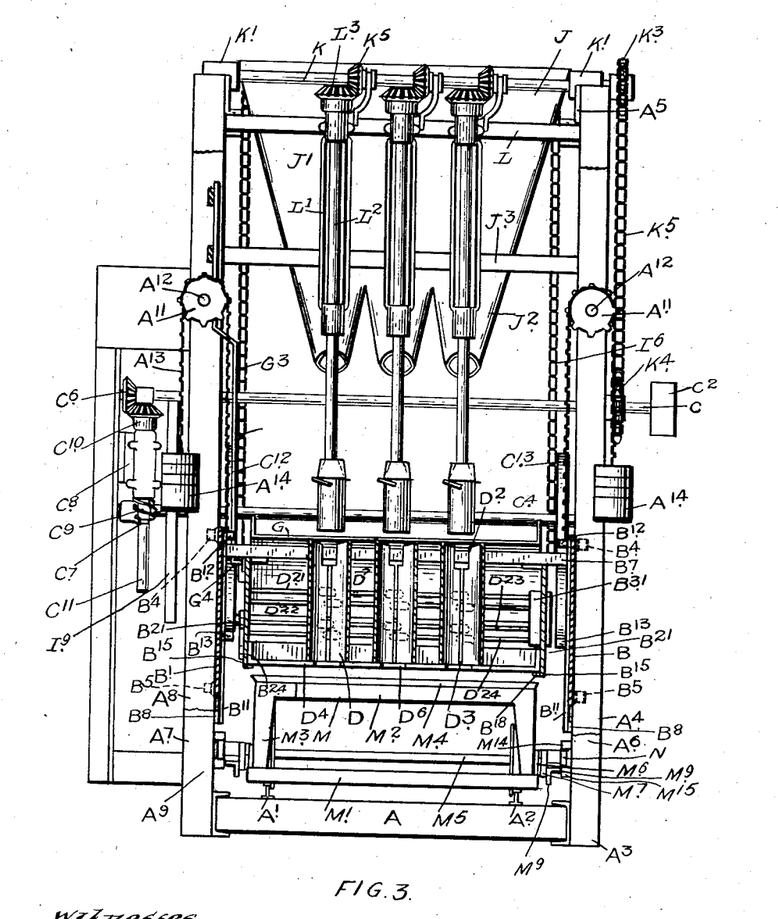
Fig. 3, is a cross sectional view on line *x—y* Fig. 2.

H is the supply hopper from which the cement is fed. The supply hopper H is provided with a forwardly extending lip H' open at the front at $H^2$ (see Fig. 2). Between the sides of the lip H' is journaled the shafts $H^3$ on which is mounted the sprocket wheel $H^4$ and a driving sprocket $H^5$.

$H^6$ is a supplemental shaft journaled in the standards E and E' and on which is mounted sprocket wheels $H^7$.

$H^8$ is a chain conveyer provided with a series of bucket plates $H^9$. The chain conveyer $H^8$ is mounted upon the sprockets $H^4$ and $H^7$.

$H^{19}$ is a sprocket gear mounted upon a suitable shaft $H^{10}$ and connected by a sprocket chain $H^{11}$ to the driving sprocket $H^5$ of the conveyer $H^8$.

I are brackets extending rearwardly from the standards $A^4$ and $A^8$.

I' is a shaft journaled in suitable bearings in the bracket I and on which is mounted the sprockets $I^2$ and $I^3$.

$I^4$ is a shaft connected by gears $I^5$ to the sprocket $H^{19}$. The shaft $I^4$ extends through the hopper H and has mounted thereon the sprockets $I^5$.

$I^6$ is a bucket chain conveyer mounted upon the sprockets $I^2$ and $I^5$ and provided with buckets $I^7$ and $I^8$.

$I^9$ is a main driving sprocket mounted upon the supplemental shaft $C^4$ and connected by a chain $I^{10}$ to the sprocket $I^3$ mounted on the shaft I'.

J is the receiving hopper designed to feed the cement into the molds. The hopper J is formed by a main upper portion J'. The contents of the buckets $I^7$ and $I^8$ are dumped into the hopper.

$J^2$ are chutes extending from the upper portion J' to each separate mold.

$J^3$ is a cross bar secured to the standards $A^4$ and $A^8$ and $J^4$ is a collar extending around the base of the hopper and suitably bolted or riveted to the bar $J^3$ so as to support the hopper.

K is a shaft journaled in bearings K' forming part of the plates $A^5$.

$K^3$ is a sprocket gear mounted upon the shaft K and $K^4$ is a sprocket gear mounted upon the main shaft C.

$K^5$ is a sprocket chain connecting the sprockets $K^4$ and $K^3$ together.

$K^{15}$ are a series of bevel gears mounted upon the shaft K.

L is a cross bar extending between the standards $A^4$ and $A^8$.

L' are journal brackets suitably secured to the bars L and $J^3$.

Figure 1:
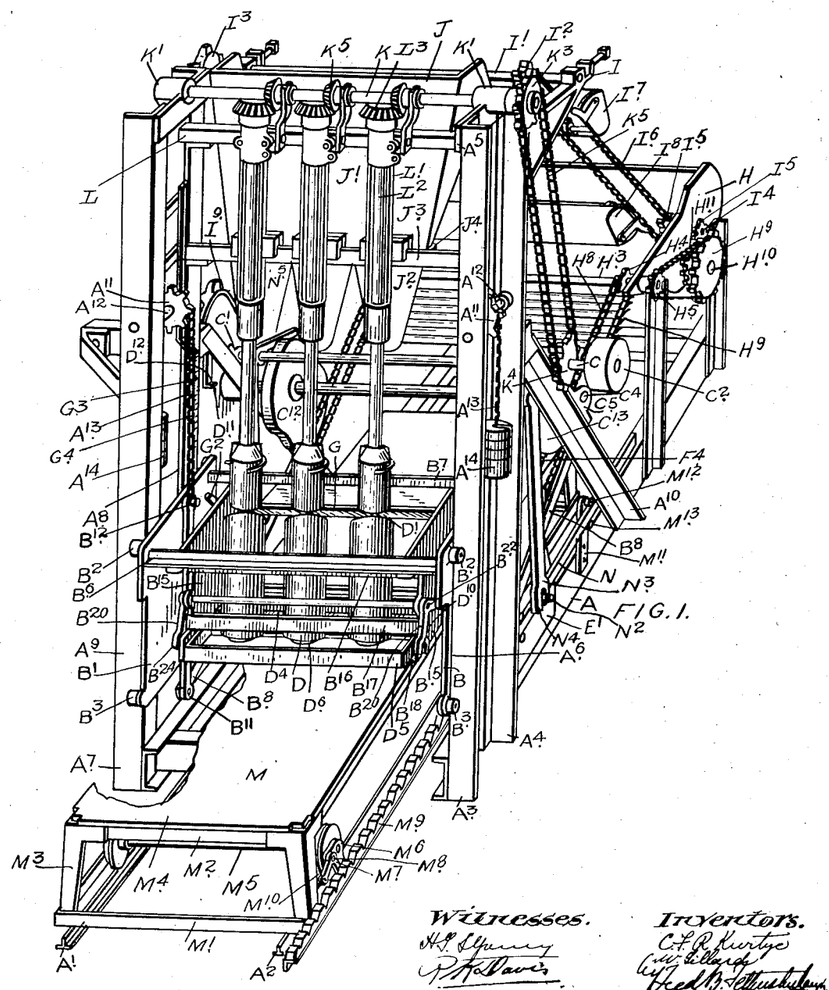
Figure 1, is a general perspective view of our machine.

$L^2$ are vertical shafts journaled in the brackets L', and $L^3$ are beveled gears mounted upon the upper end of the shafts $L^2$ and meshing with the bevel gears $K^{15}$. The vertical shafts $L^2$ having enlarged portions $L^{10}$ which are provided with opposite spiral wings or clutches $L^{14}$ and $L^{15}$ (see Figs. 1 and 2).

M is the truck onto which the tiles are deposited when complete. The truck M comprises a main rectangular frame M' and an upper rectangular frame $M^2$ supported upon the lower frame by legs $M^3$. The upper frame $M^2$ is provided with a suitable platform $M^4$.

$M^5$ are axles of the truck connected to the lower frame M' by the brackets $M^6$.

$M^7$ are bell cranks swung upon the pins $M^8$ extending from the journal bracket $M^6$.

$M^9$ is a ratchet bar secured to the depending arm of the bell crank $M^7$.

$M^{10}$ is a brake shoe pivotally connected to the upper arm of the bell crank.

$M^{11}$ is a supplemental standard secured to the base frame A and provided with guiding rollers $M^{12}$ and $M^{13}$.

$M^{14}$ and $M^{15}$ are guiding rollers journaled on pins extending from the standards E and E'.

N is a longitudinal slidable rod held between the rollers $M^{12}$ and $M^{13}$ and the rollers $M^{14}$ and $M^{15}$.

N' is a spring dog pivotally connected to the forward end of the bar N and designed to engage with the teeth of the ratchet rack $M^9$.

$N^2$ is a pin extending from the bar N.

$N^3$ is an arm swung upon the main shaft C and provided at its lower end with a forked end $N^4$ engaging the pin $N^2$.

$N^5$ is an arm also swung upon the main shaft C and provided with a quadrantal extension $N^6$ having an arc-shaped slot $N^7$ therein through which the adjusting bolt $N^8$ extends into the arm $N^3$.

$N^9$ is a cam plate secured to the arm $N^3$ and $N^{10}$ is a roller journaled on the cam $C^{12}$.

$N^{11}$ is a bracket designed to engage the roller $D^9$ to operate the lever $D^7$.

Having described the principal parts involved in our invention we will now briefly describe the operation of the same.

The cams $C^{12}$ and $C^{13}$ revolve in the direction of the arrow thereby releasing the levers $B^8$ and allowing them to rise and also allowing the mold frame contained between the plates B and B' to rise in the guide ways $A^6$ and $A^9$. The mold frame and molds are then carried upwardly by means of the counter weights $A^{14}$ until the screw flanges $L^{14}$ and $L^{15}$ are in contact with the bottom of the molds formed by the slidable members $D^4$ and $D^5$. In this position of the screw the major portion or body $L^{10}$ projects through the opening formed by the semi-circular notches $D^6$. As the molds D rise to this position the arm $B^{30}$ contacts with the right angular portion $D^{12}$ of the depending arm $D^{11}$ thereby forcing the arm $B^{30}$ downwardly around its pivoted point formed by the pin $B^{29}$. Thus the movement of the arm $B^{30}$ throws the depending forked ends $B^{24}$ of the bell cranks $B^{20}$ and $B^{21}$ inwardly toward each other thereby carrying the slidable members $D^4$ and $D^5$ into contact at their inner ends and so that the openings formed by the notches $D^6$ are concentric with the center of the molds D. Simultaneously the spill board G is tilted into a horizontal position substantially on a level with the bottom of the notches $D^2$ of the molds D by means of the counter weights $G^6$. During this operation the buckets $I^7$ and $I^8$ of the conveyer $I^6$ carry cement from the hopper H upwardly so as to deposit it in the main portion $J'$ of the hopper J which leads the cement to the chutes $J^2$. The chutes $J^2$ deliver an equal portion of the cement into each mold D. It will be understood that the former heads $L^6$ are rotated continuously being driven through the main shaft by the sprockets $K^3$ and $K^4$, sprocket chain $K^5$, shaft K, bevel gears $K^6$ and $L^3$ and vertical shaft $L^2$. It will be readily seen that as the former revolves within the mold that the screw flanges contained in the mold will gradually force the cement downwardly beneath the flanges until the cement is packed to the required density. By this means the tile is gradually built up within the mold and as it is built up the mold itself is gradually forced downwardly away from the flanges by the cement packed between the flanges and the bottom of the mold and against the pressure of the counter weights $A^{14}$ which tend to hold the mold and the packed cement against the flanges $L^{14}$ and $L^{15}$. Of course as the molds D are forced downwardly the counter weights $A^{14}$ are gradually raised. The pressure required in forming the tile may be varied by taking off one or more supplemental weights from the weight $A^{14}$. This operation continues until the flanges $L^{14}$ and $L^{15}$ and the former head are on a level with the bottom of the notches $D^2$ of the mold D. Through these notches the surplus cement left in the mold at this stage of the operation is thrown radially outwardly by the revolving wings $L^{24}$ onto the horizontally set spill board G.

The former head $L^6$ continues to revolve with the flanges $L^{14}$ and $L^{15}$ in contact with the upper end of the tile thereby finishing off such upper end smoothly and evenly. By the time this operation is completed the cams $C^{12}$ and $C^{13}$ have revolved sufficiently to bring the rollers $B^{13}$ again into engagement with the eccentric portions of the cams thereby forcing the levers $B^8$ downwardly and carrying the mold frame and molds D away from the former heads by means of the connecting links $B^{11}$ and into the position shown in the drawings that is, onto the upper surface of the platform $M^4$. Immediately the mold has reached the level of the platform $M^4$ the plate $N^{11}$ secured to the face of the cam $C^{12}$ in a similar manner to the cam $C^{13}$ engages the roller $D^9$ throwing the lever $D^7$ on its fulcrum $E^2$ and thereby carrying the arm $D^8$ thereof against the arm $B^{30}$ and raising the arm $B^{30}$ and thereby throwing the forked ends $B^{24}$ of the bell cranks $B^{20}$ and $B^{21}$ outwardly. This operation carries the slidable members $D^4$ and $D^5$ outwardly from beneath the bottom of the molds D. The molds are now in a position for opening. This operation is accomplished by means of the plate $N^{12}$ of a cam $C^{13}$ engaging the roller $F^6$ and forcing the rear end of the lever $F^4$ downwardly and the forward end of the lever $F^4$ upwardly against the arm $F^2$.

Figure 5:
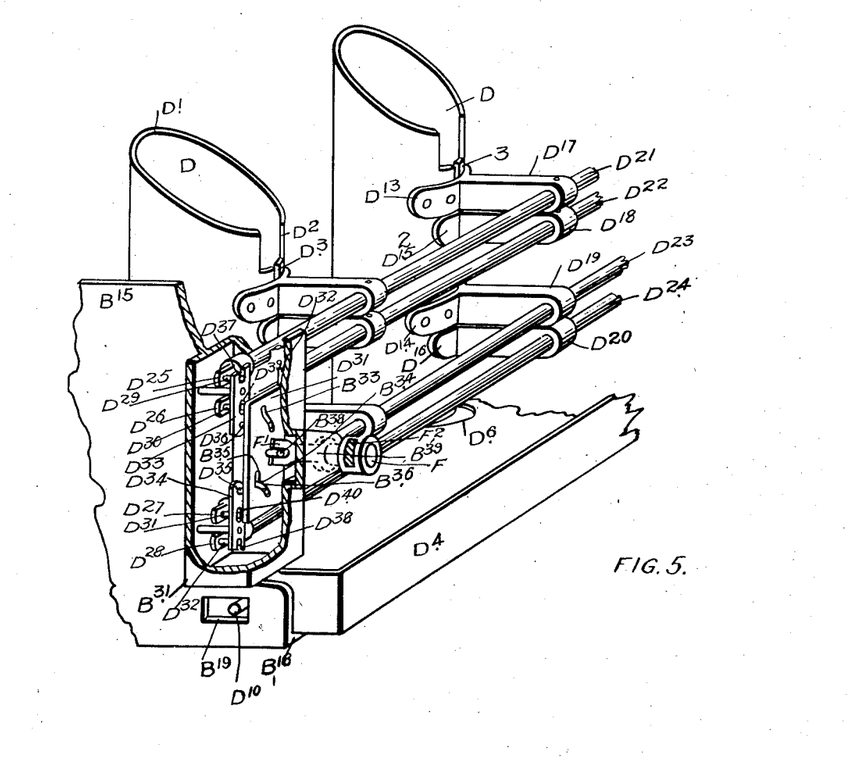
Fig. 5, is a further enlarged detail of a portion of the mold frame and molds showing the mechanism for opening and closing the molds.

The forked arm $F'$ as has been before described is directly integral with the arm $F^2$ and moves in unison therewith. As the arm $F^2$ is forced upwardly the forked arm $F'$ also carries the plate $D^{51}$ upwardly in the guide ways $D^{52}$. This movement moves the pins $D^{35}$ and $D^{36}$ from the top of the slots $B^{33}$ and $B^{35}$ to the bottom of the slots $D^{32}$ and $B^{34}$ or into the position shown in the drawings. By this operation the levers $D^{33}$ and $D^{34}$ are carried around on their fulcrum formed by the pins $B^{40}$ and $B^{41}$. This operation carries the levers $D^{33}$ and $D^{34}$ around their fulcrums by reason of the sliding of the pins $D^{35}$ and $D^{36}$ in the slots $B^{33}$ and $B^{34}$ and by means of the pins $D^{29}$ and $D^{30}$, $D^{31}$ and $D^{32}$ which are fastened to the flattened end of the rods $D^{21}$ and $D^{22}$, $D^{23}$ and $D^{24}$ and engage the levers $D^{33}$ and $D^{34}$ in forked ends $D^{37}$ and $D^{38}$ and in the slots $D^{39}$ and $D^{40}$ thereby moving the rods $D^{21}$ and $D^{23}$ longitudinally in the direction of the arrow and the rods $D^{22}$ and $D^{24}$ longitudinally in the opposite direction to that indicated by the arrow Fig. 5. As has been before described the arms $D^{17}$, $D^{18}$, $D^{19}$ and $D^{20}$ are secured on the rods $D^{21}$, $D^{22}$, $D^{23}$ and $D^{24}$ and will therefore when operated separate the sides 2 and 3 of the molds D at the central split $D^3$.

To insure of the tile passing freely from the mold, the opening mechanism is arranged so that the top end of the mold is opened first thereby freeing the major portion of the tile and yet supporting it in the mold around the bottom. It will be noticed that the slot $B^{34}$ is formed with the vertical portion $B^{35}$. It will thus be seen that as the plate $D^{51}$ is carried upwardly as hereinbefore described that the slot $B^{33}$ will operate the rods $D^{21}$ and $D^{22}$ by the initial movement of the mechanism so as to open the upper end of the mold. During this initial movement the pin $D^{35}$ travels down, the vertical portion $B^{35}$ of the slot $B^{34}$ thereby rendering this portion of the mechanism inoperative during this movement. As soon, however, as the pin $D^{35}$ enters the arc-shaped portion $B^{36}$ the rods $D^{23}$ and $D^{24}$ are operated to open the bottom of the mold thereby depositing the tile on the platform $M^4$. The mold frame and mold D again rise as herein before described carrying the mold free of the tile. As the mold frame and mold D is brought to this lowermost position the arm $G^2$ engages the right angular portion $G^4$ thereby tilting the spill board from a horizontal position into a position shown and depositing the spilt cement onto the supplemental spill board $G^5$. As the mold frame again rises the spill board G is so balanced to drop again into its normal or horizontal position.

The supplemental spill board $G^5$ is tilted rearwardly by the counter weights $G^6$ thereby depositing the surplus cement on the bucket portion $H^9$ of the chain conveyer $H^8$. The conveyer slots $H^9$ convey the surplus cement back again into the supply hopper H. After the tile has been made and deposited on the platform $M^4$ as hereinbefore described it is necessary to move the truck M forward sufficiently to allow of depositing another set of tiles on the platform. This is accomplished by the following means. The roller $N^{10}$ journaled on the cam $C^{12}$ engages with the cam plate $N^9$ swinging the lever $N^3$ forward. The lower forked end of the lever $N^3$, straddling pin $N^2$ carries the bar N longitudinally forward tilting the bell cranks $M^7$ on their pivot $M^8$ and freeing the brake shoe $M^{10}$ from the periphery of the wheel $M^{16}$ thereby freeing the wheel and allowing the truck to be pushed forward by the bar N and spring dog $N'$. As soon as the roller comes into contact with the arm $N^5$ the reverse movement is imparted to the bar N thereby freeing the ratchet bar $M^9$ and allowing the bell crank $M^7$ to swing again into the normal position and carry the brake shoe into contact with the wheel $M^{16}$ thereby positively locking the truck in position and ready to receive another set of tiles.

In order to vary the feed of the truck in proportion to the size of the tile we have provided the adjusting bolt $N^8$ which passes through the slot $N^7$ into the arm $N^3$ thereby allowing of the adjustment of the arm $N^5$ so as to vary the throw of the arm $N^3$.

The platform $M^4$ provided with the legs $M^3$ rests upon the lower rectangular frame $M'$ so as to be removable. When the platform $M^4$ has received its full complement of tiles, such platform may be removed with its supporting legs from the frame $M'$ and placed away for storage and another platform placed in position upon the frame $M'$.

Although in this specification we refer to our machine as a cement tile making machine, it will, of course, be understood that the machine may be used for many purposes such as making drain pipes and sewer pipes.

What we claim as our invention is:

1. A cement tile making machine comprising a main frame having vertical guide-ways, a yieldable mold frame supported in the guide-ways and having a divided bottom provided with an opening therein across which the division of the divided bottom extends diametrically, a mold secured in the mold-frame of greater diameter than the aforesaid opening and concentric with the center of such opening, a screw former designed to gradually build up the tile within the mold, and means for supporting the divided bottom of the frame so as to deliver the tile, as described.

2. In a cement tile making machine, the combination with the main frame provided with vertical guide-ways, of a mold supported within the guide-ways, tubular molds secured within the mold-frame and having a vertical split in the rear wall thereof, formers designed to build up the tile within the molds, and means for automatically enlarging the split at the top of the mold to free the tile when completed and then subsequently spreading the bottom portion of the split open to deliver the tile, as and for the purpose specified.

3. In a cement tile making machine, the combination with the main frame, a mold frame supported in suitable guide-ways in the main frame, and molds secured to the mold frame and having a vertical notch extending downwardly from the top, of a former designed to coact with the mold to build up the tile therein and having radial wing-like ribs designed to throw the surplus cement, as the tile is completed, through the notches, as described.

4. In a device of the class described, the combination with a mold having a vertical split extending through one side of the mold from the top to the bottom, of means for automatically enlarging the split at the top to free the tile and then at the bottom to deliver the tile, as and for the purpose specified.

5. In a cement tile machine, the combination with a main frame having vertical guide-ways, of a mold frame supported within said guide-ways, tubular expansible molds secured in said mold frame, and a divided bottom for the molds, and means for automatically separating the parts of the bottom when the molds are enlarged in diameter so as to deliver the molded tile, as described.

6. The combination with a main frame having vertical guide-ways, of a vertically movable mold frame arranged slidably in said guide-ways, vertical molds carried by said mold frame and divided vertically, means for enlarging the mold circumferentially, a bottom for the mold which is adapted to open to permit the delivery of tiles from the mold, a rotatable main shaft, and means operatively connecting it with the mold frame, the molds, and the bottoms thereof.

CHARLES FREDERICK REIMAR KURTZE.
WILLIAM GILLARD

Witnesses:
 J. P. WALSH,
 HELEN W. McPHERSON.